(No Model.)

J. B. T. HULL.
NUT LOCK.

No. 329,649. Patented Nov. 3, 1885.

2 Sheets—Sheet 1.

WITNESSES
F. L. Ourand
Wm. J. Littell

J. B. T. Hull,
INVENTOR by J. R. Littell,
Attorney.

(No Model.) 2 Sheets—Sheet 2.
J. B. T. HULL.
NUT LOCK.
No. 329,649. Patented Nov. 3, 1885.
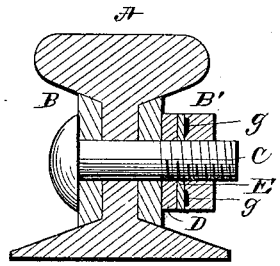
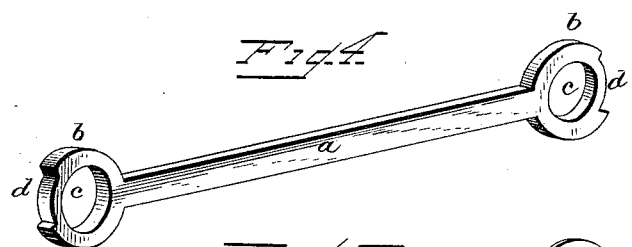
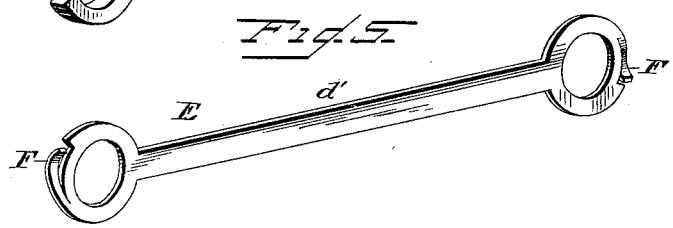
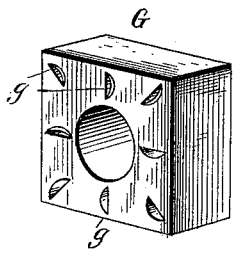
WITNESSES.
F. L. Ourand
Wm. J. Littell
J. B. T. Hull,
INVENTOR
by J. R. Littell,
Attorney.

UNITED STATES PATENT OFFICE.

JOHN BAKER THOMPSON HULL, OF BALTIMORE, MARYLAND.

NUT-LOCK.

SPECIFICATION forming part of Letters Patent No. 329,649, dated November 3, 1885.

Application filed August 13, 1885. Serial No. 174,291. (No model.)

*To all whom it may concern:*

Be it known that I, JOHN BAKER THOMPSON HULL, a citizen of the United States, residing at Baltimore, in the State of Maryland, have invented certain new and useful Improvements in Nut-Locks; and I do hereby declare that the following is a full, clear, and exact description of the invention, which will enable others skilled in the art to which it appertains to make and use the same.

My invention relates to nut-locks, the object being to provide at a slight cost a device of the character mentioned, which shall be simple in its construction, strong and durable, readily and easily applied or detached—one that will serve to effectively prevent the detachment of the nuts from the bolts by shocks or jars.

With these ends in view the invention consists in the improved construction and combinations of parts hereinafter fully described, and pointed out in the claims.

Figure 1:
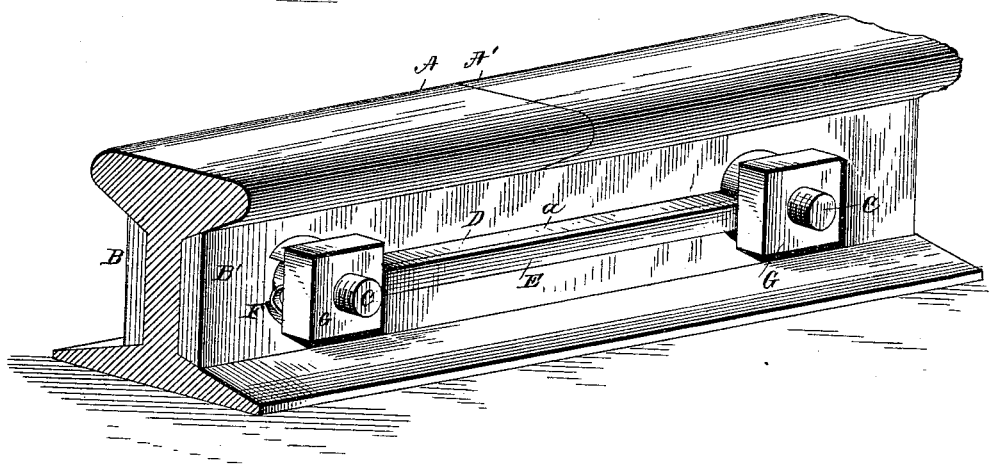
Figure 2:
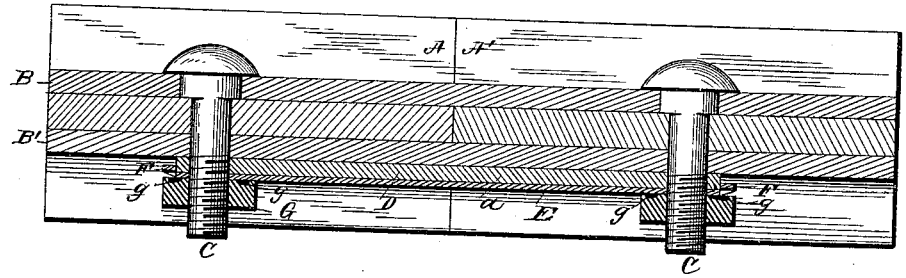

In the drawings, Figure 1 is a perspective view illustrating a nut-lock embodying my invention. Fig. 2 is a horizontal section of the same. Fig. 3 is a transverse section. Fig. 4 is a detail view of the washer-plate. Fig. 5 is a detail view of the locking-plate, and Fig. 6 is a detail view of one of the nuts.

Corresponding parts in the several figures are denoted by the same letters of reference.

Referring to the drawings, A A' represent portions of two railroad-rails.

B represents the outer fish-plate, and B' the inner fish-plate. These fish-plates B B' are arranged so as to connect the rails at their meeting ends, and passing through the fish-plates and rails are threaded bolts C.

D represents a washer-plate, which is arranged to connect the bolts C. This washer-plate D consists of a bar, $a$, having enlarged, and preferably circular, heads $b$ at its ends, and in these heads $b$ are formed openings $c$, through which the ends of the bolts C pass. Upon the outer side of each of the heads $b$ are formed circular recesses $d$, for a purpose which will be hereinafter more fully explained.

E represents the locking-plate constructed of suitable metal, and comprising a bar, $d'$, having its ends provided with heads $e$, which are formed with openings. This locking-plate is located upon the threaded portions of the bolts C, and fits or bears against the washer-plate D.

F represents spring-arms, which are formed by cutting out the outer sides or ends of the heads of the locking-plate. These arms F are bent downwardly, so that they rest in the recesses $d$ of the heads of the washer-plate, and the ends of the spring-arms are bent outwardly, so that their ends project beyond the locking-plate.

G represents the nuts, which are provided on their inner faces at desired intervals with a series of radially-arranged notches or grooves, $g$, with any one of which the ends of the spring-arms F are adapted to engage.

The operation is as follows: The fish-plates being adjusted in place in the usual way, the washer-plate is placed upon the bolts, after which the locking-plate is adjusted in position upon said bolts. Upon the nuts being tightened to place the spring-arms are forced inwardly, and as soon as any one of the notches is reached the spring-arm engages the same and prevents the nuts from being unscrewed to remove it until the spring-arm has been forced inwardly, so that it will be withdrawn from the notch. By this arrangement the nuts may be adjusted as tight as desired, and will be firmly and securely held in place by the spring-arms. As the heads of the washer-plate are recessed, it will be seen that the spring-arms may be readily and easily forced inwardly from engagement with the notches in the nuts by the employment of a suitable key.

I am aware that it is not new to provide a nut on its inner face with a series of notches, and a locking-plate on the bolt having spring-arms to engage said notches. I therefore do not broadly claim such construction; but,

Having thus described my invention, I claim—

1. In a nut-lock, the combination, with the rails connected by fish-plates arranged upon threaded bolts, of a washer-plate arranged upon and connecting the bolts and having recesses in its ends, and a locking-plate arranged upon said bolts, and having spring-arms adapted to engage grooves or notches on the inner faces of the nuts, and to rest in the recesses of the washer-plate, whereby the nuts may be removed by forcing the spring-arms out of engagement with the notches and into the recesses of the washer-plate, substantially as set forth.

2. In a nut-lock, the combination, with the rails, fish-plates, and bolts, of the washer-plate having recesses in its ends, the locking-plate having spring-arms located in said recesses, the ends of said arms projecting beyond the locking-plate, and nuts having notches on their inner faces, said washer and locking plates being arranged upon and connecting the bolts, as set forth.

3. In a nut-lock, the combination, with the rails, the bolts passing through the latter and the fish-plates connecting said bolts, of the washer-plate consisting of a bar having heads formed with openings and recesses, the locking-plate consisting of a bar having heads formed with openings, and cut out to form spring-arms, and the nuts having notches on their inner faces, substantially as set forth.

In testimony whereof I affix my signature in presence of two witnesses.

JOHN BAKER THOMPSON HULL.

Witnesses:
CHAS. EDWD. COATES, Jr.,
W. GIBSON CAREY.